United States Patent [19]

Doi et al.

[11] Patent Number: 4,841,555

[45] Date of Patent: Jun. 20, 1989

[54] METHOD AND SYSTEM FOR REMOVING SCATTER AND VEILING GLATE AND OTHER ARTIFACTS IN DIGITAL RADIOGRAPHY

[75] Inventors: Kunio Doi, Willowbrook; Yuichiro Kume, Clarendon Hills, both of Ill.

[73] Assignee: University of Chicago, Chicago, Ill.

[21] Appl. No.: 81,001

[22] Filed: Aug. 3, 1987

[51] Int. Cl.$^4$ .............................................. H05G 1/64
[52] U.S. Cl. ...................................... 378/99; 378/62; 378/146; 358/111
[58] Field of Search ..................... 358/111; 378/62, 99, 378/146

[56] References Cited

U.S. PATENT DOCUMENTS

| | | | |
|---|---|---|---|
| 3,783,282 | 1/1974 | Hoppenstein | 378/146 |
| 4,087,837 | 5/1978 | Geluk | 378/99 |
| 4,096,391 | 6/1978 | Barnes | 378/146 |
| 4,323,973 | 4/1982 | Greenfield | 358/111 |
| 4,633,307 | 12/1986 | Honda | 358/111 |
| 4,718,076 | 1/1988 | Doi et al. | 378/146 |

FOREIGN PATENT DOCUMENTS

| | | | |
|---|---|---|---|
| 0230155 | 7/1987 | European Pat. Off. | 378/146 |
| 2061660 | 5/1981 | United Kingdom | 358/111 |

Primary Examiner—Craig E. Church
Assistant Examiner—John C. Freeman
Attorney, Agent, or Firm—Oblon, Fisher, Spivak, McClelland & Maier

[57] ABSTRACT

A method and system for reconstructing image data obtained from plural sequential exposures of an object by a radiation source through a multiple slit beam scanning assembly, wherein frames of original image data in the form of plural pixels are obtained for each discrete scanning step/exposure and a minimum pixel value of at least one frame is determined. Based on this determined minimum value, a cutoff value is determined. The pixel values of each frame are compared with the cutoff value, and the image is reconstructed by summation of all the pixel image data above the cutoff value for each respective pixel. In order to improve spatial resolution, the slit width of the scanning assembly is selected be the narrower than the pixel size. Pixel image data produced by exposure from radiation passing through the same slit of the scanning assembly in consecutive scanning steps are then assigned to adjacent pixels in a direction perpendicular to the scanning beam of an enlarged pixel matrix. To achieve a balanced aspect ratio, pixel values for pixels in a direction parallel to the scanning beam are assigned by interpolation between pixel values assigned in the perpendicular direction.

18 Claims, 12 Drawing Sheets

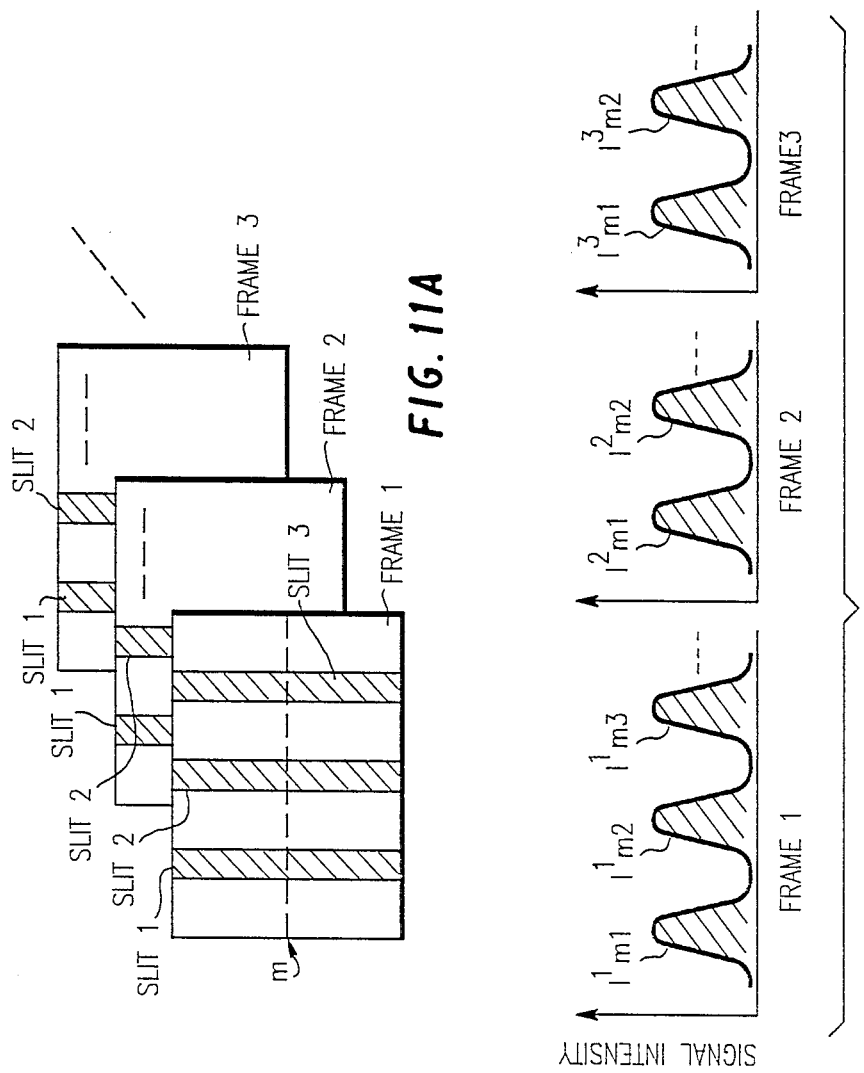

ASSIGNMENT OF PIXEL IMAGE
VALUES IN ENLARGED MATRIX

ASSIGNMENT OF PIXEL VALUES IN
ENLARGED MATRIX BY
LINEAR INTERPOLATION

METHOD AND SYSTEM FOR REMOVING SCATTER AND VEILING GLATE AND OTHER ARTIFACTS IN DIGITAL RADIOGRAPHY

BACKGROUND OF THE INVENTION

1. Field of the Invention

This invention relates to a method and system for removing scatter, veiling glare and other artifacts in x-ray images obtained using multiple slit beam imaging techniques in digital radiography.

2. Discussion of Background

Scatter radiation from an object can significantly degrade the image quality of radiographs. It has been shown that the fan beam imaging technique, in which a single slit scanning x-ray beam is used, is an effective method for removing the scattered radiation, and thus for increasing the contrast sensitivity of the acquired image. However, this method requires a long exposure time for beam scanning, and the x-ray beam utilization is extremely poor. These disadvantages for practical use for such techniques can be improved by employing multiple slit x-ray beams. Although studies with multiple slit beams were initially carried out with conventional screen-film systems, some of these methods are now being applied to digital imaging systems. In some of these digital systems image intensifier-television (I.I.-TV) systems are employed as detectors. However, the images obtained with the I.I.-TV system include veiling glare which arises from the input and/or output phosphor of the I.I., from the optical system, and from the TV camera. The veiling glare is known to degrade image quality. In addition, scatter and veiling glare degrade contrast signals non-linearly and hinder quantitative measurements such as quantitation of iodine content by video-densitometry.

SUMMARY OF THE INVENTION

Accordingly, one object of this invention is to provide a novel method and system for removing scatter and veiling glare and other artifacts in original radiographic image data obtained by multiple slit beam scanning of an object.

Another object of this invention is to improve contrast and spatial resolution in reconstructed images obtained in processing of original image data to enable reliable quantitative measurements of predetermined image characteristics from the reconstructed image data.

These and other objects are attained according to the invention by providing a new and improved method and system for reconstructing image data obtained from an image acquisition system from plural sequential exposures of an object by a radiation source through a multiple slit beam scanning assembly, wherein frames of original image data in the form of plural pixels are obtained from each discrete scanning step/exposure and a minimum pixel image value of at least one frame is determined. Based on this determined minimum value, a cutoff value is determined. The pixel values of each frame are compared with the cutoff value, and the image is reconstructed by summation of all the pixel image data above the cutoff value of each respective pixel.

Further, according to the invention, line artifacts are reduced by overlap scanning, in which the beam widths of adjacent frames of radiation exposure overlap adjacent sampling apertures.

According to a second aspect of the invention, in order to achieve spatial resolution improvement with the multiple slit beam imaging technique, the slit width is selected to be narrower than the pixel size of the image acquisition system. In particular, the slit width projected onto the image input plane is selected to be a predetermined fraction of the sampling aperture of the image acquisition system, and thus two signals corresponding to two different slit placements in two different frames may be detected by the same sampling aperture. According to the invention these two detected signals are assigned to the two different but adjacent pixels in an image matrix of twice the size of the original image matrix. Thus, the matrix size of the reconstructed image in a direction perpendicular to the slit openings becomes twice as large as that of the image acquisition system.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 11a, 11b, 11c and 11d are schematic illustrations of the state of image reconstruction at selected locations in FIG. 10.

DESCRIPTION OF THE PREFERRED EMBODIMENTS

Figure 1:
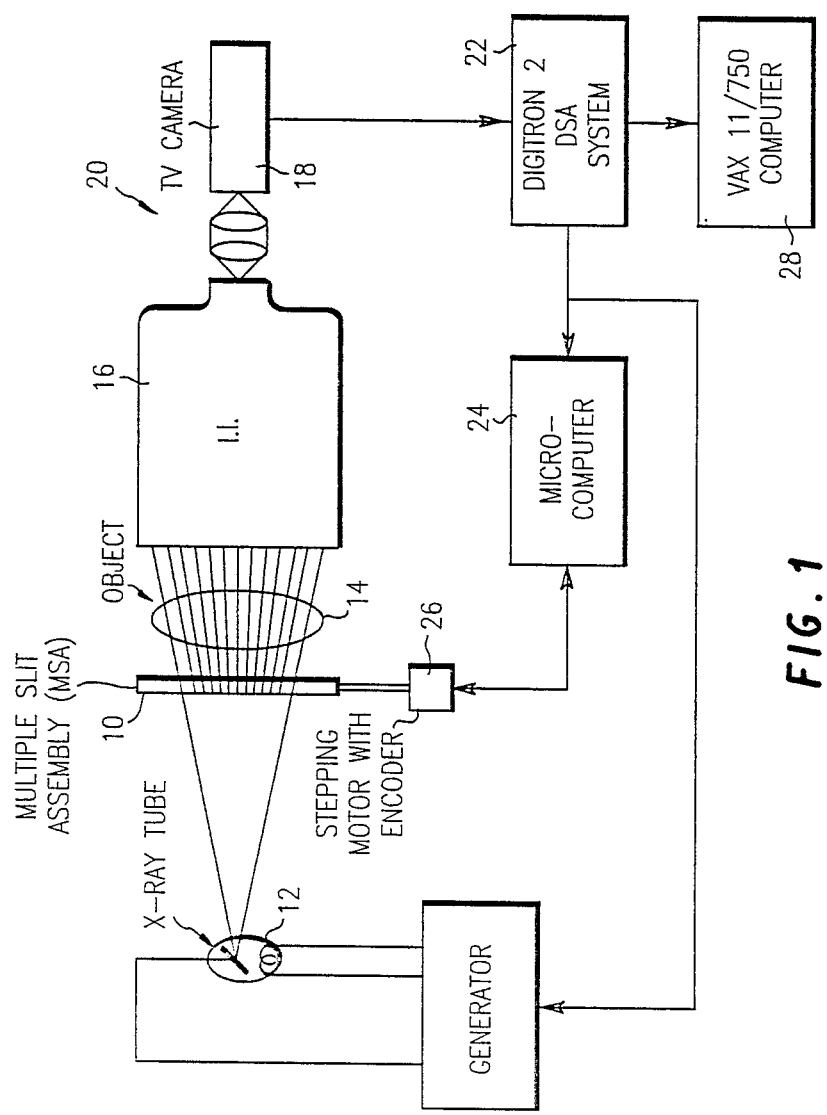
FIG. 1 is a block diagram of a multiple slit x-ray beam imaging system with an I.I.-TV digital system used in development of the present invention.

Referring now to the drawings, wherein like reference numerals designate identical or corresponding parts throughout the several views, and more particularly to FIG. 1 thereof, there is shown a block diagram of a radiographic system used in the development of the present invention. In FIG. 1, a multiple slit assembly (MSA) 10 was placed between an x-ray tube 12 and an object 14. An image intensifier (I.I.) 16 TV system 18 with progressive scanning mode were employed as the detector system 20. An antiscatter grid (40 lines/cm, 12:1 and paper spacer) (not shown) was used. The lines of the grid were placed perpendicular to the slit openings of the MSA 10 and the antiscatter grid. A digital subtraction angiography (DSA) system 22 (Siemens Digitron 2) connected to a Garantix 1000 generator (not shown) was employed for real-time and digital image acquisition. The images were digitized by a 10 bit analog-to-digital (A/D) converter after logarithmic amplification. The matrix size of the digitized image with this system is 512×512. The MSA 10 was scanned mechanically with a stepping motor 26, which was controlled by a microcomputer 34 and was synchronized with pulsed x-ray exposures to move the MSA 10 to the next position between exposures. The digital data of acquired MSA images were transferred via magnetic tape from the DSA 22 to a DEC VAX computer 28 which was connected to an image processor system (not shown). The calculations required for image reconstruction from the original MSA images were performed by the VAX system 28.

The configuration of the MSA 10 is similar to that of an antiscatter grid and consists of lead spacers and of aluminum foils which correspond to slit openings. This mechanical structure makes it possible to construct the MSAs accurately, even if the slit width and lead spacer width are very narrow. The slit openings are focused to the focal spot of the x-ray tube. The thickness of the MSA is approximately 2 mm.

Original images (called "original" because other images can be constructed from them) obtained from the MSA image frames include bright lines which correspond to the slit openings and which contain the primary component, together with some scatter and veiling glare, and dark areas between bright lines which include scatter and veiling glare components which are contributed from the x-ray beams transmitted through the slit openings. An enhanced image, which consists mainly of the primary component, is reconstructed from a set of similar MSA images, the summation of which can provide an image equivalent to that obtainable with a conventional wide beam exposure.

Figure 2:
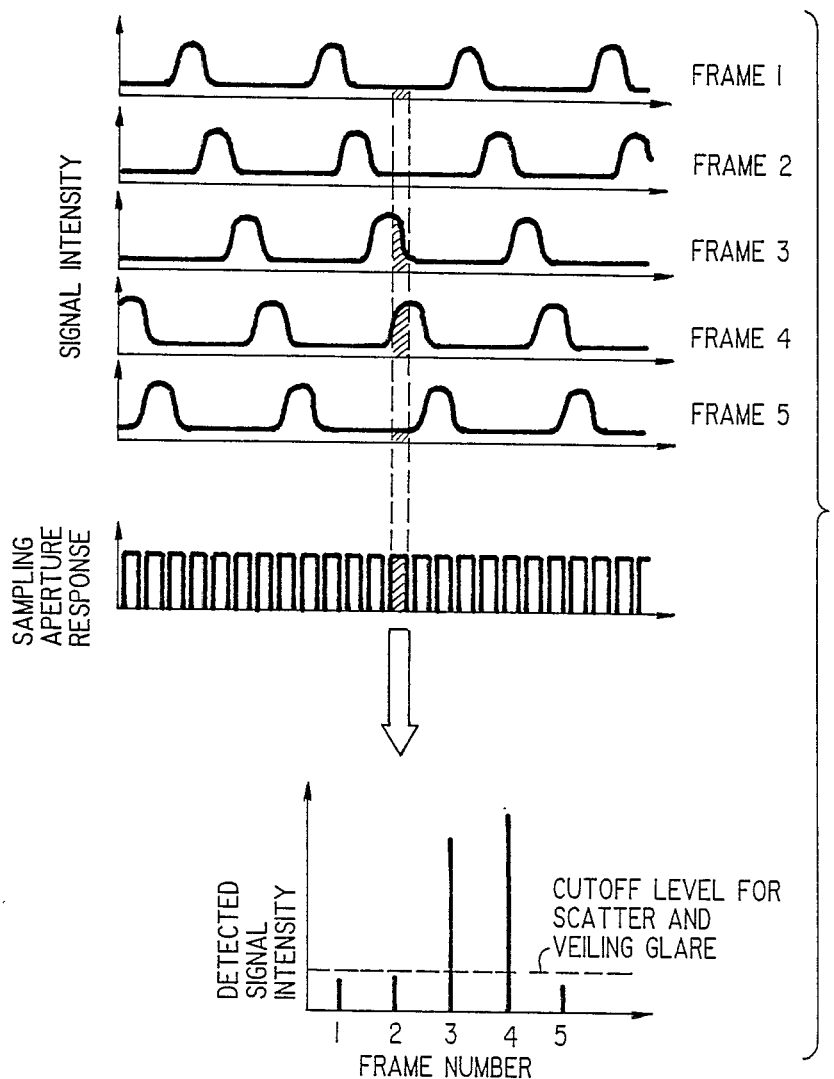
FIG. 2 is a timing diagram illustrative of the method of the invention used for the reconstruction of an image based on the primary component of radiation impinging on the detection system, wherein at each pixel, the detected signals above the cutoff level selected for scatter and veiling glare are summed to yield the primary component.
Figure 3:
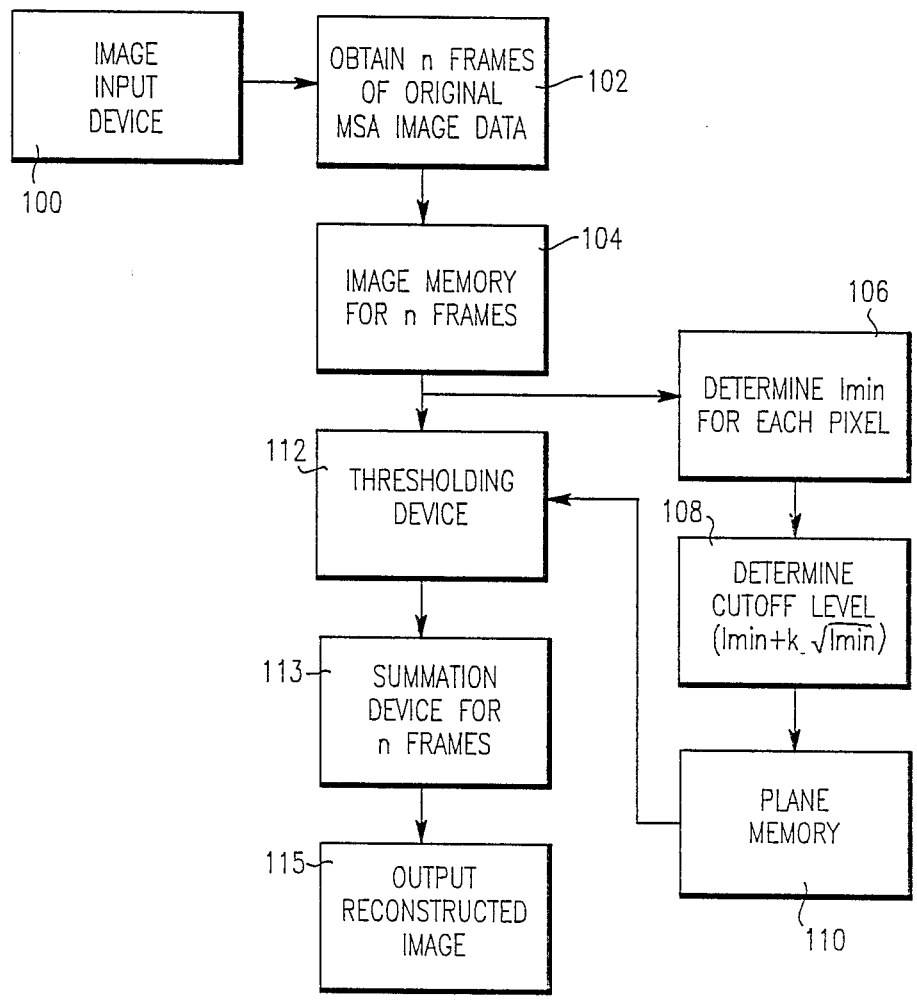
FIG. 3 is a schematic block diagram illustrating the image reconstruction processing performed according to the present invention.

The method of image construction according to the present invention is illustrated schematically in FIG. 2, in which five image frames are assumed to be required for image reconstruction. A schematic diagram illustrating the processing performed in image reconstruction according to the invention is shown in FIG. 3. In FIG. 2, image profiles and sampling apertures are shown in a direction perpendicular to the slit openings.

Referring now to both FIGS. 2 and 3, using an image input device (block 100), such as shown in FIG. 1, n frames of original MSA image data are obtained and stored in an image memory (block 104). In FIG. 2, the shadowed pixel detects the shadowed portion of the original MSA image signal in each frame. For each pixel of the I.I.-TV digital system 20, a minimum detected signal intensity, $I_{min}$, for the n frames of image data is determined (block 106). Then a cutoff level, $I_{cutoff}$, is determined (block 108). The $I_{cutoff}$ level for each pixel is stored in a plane memory (block 110). Then, the cutoff levels stored in plane memory (block 110) are synchronously read out and applied to thresholding device (block 112) while the n frames of image data stored in memory (block 104) are applied to the thresholding device (block 112). After detecting which pixels of the n frames of image data exceed the respective cutoff levels by means of the thresholding device, the detected signals above the cutoff level are summed to yield the primary component (block 113) with scatter and veiling glare removed. The cutoff level $I_{cutoff}$ is determined empirically as the minimum signal intensity plus a predetermined amount, e.g., one-fourth of the square root of the minimum signal intensity, which corresponds to the lowest value among the n frames. Thus, in block 108 $I_{cut-off} = I_{min} + k\sqrt{I_{min}}$ where k is a predetermined fraction less than one. If the chosen cutoff level is too low, the final reconstructed image will contain some scatter and veiling glare. Conversely, if the cutoff level is too high, some primary components will be lost, and thus it may result in dark line artifacts. The computation for image reconstruction is performed in terms of relative x-ray intensity, which is converted from the pixel value by use of the characteristic curve of the I.I.-TV system 20. The reconstructed image data are normalized to the maximum value of the reconstructed image date, which is obtained by searching for the largest value in the reconstructed image, and then converted back, for image display and storage, to pixel values by use of the characteristic curve and then outputted (block 115). In actual experiments performed, it was clear that the contrast and sharpness of the reconstructed MSA image are superior to those of the conventional I.I.-TV image. This advantage of the reconstructed image is due to the reduction of scatter and veiling glare, as discussed in detail below.

In order to quantify the unique advantage of the MSA imaging technique in terms of the rejection of scatter and veiling glare components, the fraction of scatter and veiling glare was measured by using the lead disk method described by K. Doi, et al., *Radiology* 161:513 (1986). A lucite phantom of 15 cm thickness was employed. The 3 mm thick lead disks, the diameters of which were 2.25, 2.5, 3, 5, 8, 10 and 15 mm, were placed on the x-ray tube side of the phantom. The fraction of scatter and veiling glare was determined by the ratio of the x-ray intensity behind the lead disk to the x-ray intensity outside the disk. The fractions were measured for conventional wide beam images and for reconstructed MSA images, which were obtained with and without grid.

Figure 4:
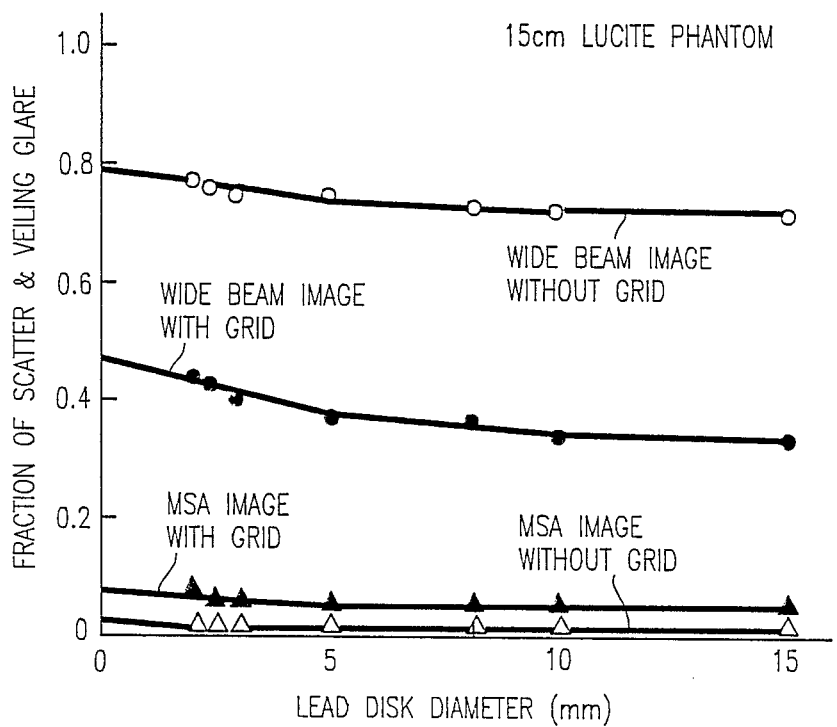
FIG. 4 is a graph illustrating the fraction of scatter and veiling glare, measured with the lead disk method in conventional wide beam images and in reconstructed MSA images according to the invention with and without the use of an antiscatter grid.

FIG. 4 shows the relationship between the measured fractions and the lead disk diameter. It is apparent that scatter and veiling glare are reduced significantly when the MSA imaging technique is used. The reduction of these fractions in images without grid is far greater than that with the grid. In original MSA images, however, scatter and veiling glare are much greater without than with the grid, and thus the amount of scatter and veiling glare which is included in areas behind the lead spacers tends to be overestimated in the present reconstruction method when the grid is not used. Therefore, the fraction of scatter and veiling glare remaining in the reconstructed image becomes smaller than that with the grid.

Figure 5:
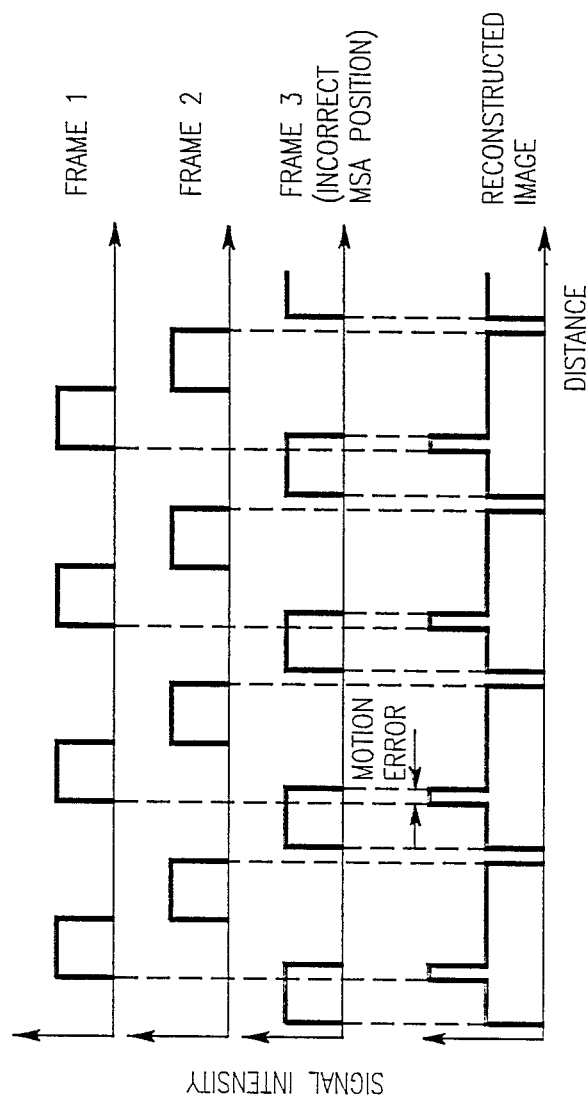
FIG. 5 is a timing diagram illustrating line artifact caused by a scan motion error.
Figure 6:
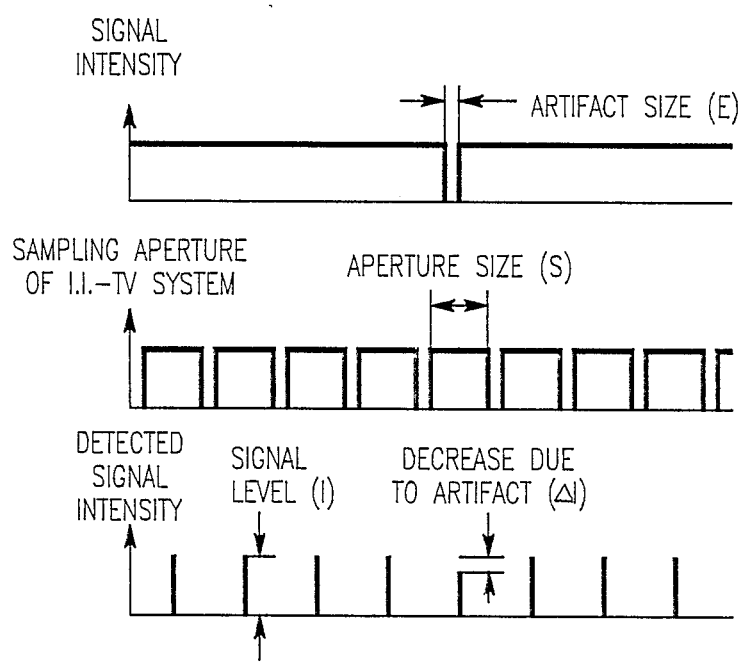
FIG. 6 is a timing diagram illustrating detected artifact in a digital image signal, in which line artifacts are observed only after the analog signal is detected through the sampling aperture and converted to the digital signal.

FIG. 5 illustrates a line artifact caused by an error in scan motion. It is assumed that the position of the MSA in Frame 3 is incorrect because of this error. This results in a shift of the corresponding slit image so that one side of that image in this frame is spaced away from the slit image in the preceding frame, and another side of the slit image partially overlaps that in the next frame. Therefore, a pair of light and dark line-artifacts appears in the reconstructed image The scan motion line artifacts just described and other artifacts will be observed in the I.I.-TV digital system 20 only after the analog signal is converted to a digital signal through a sampling aperture (or pixel size), as illustrated in FIG. 6. If a small, dark line-artifact appears over a uniform signal, the detected signal over this artifact will be proportional to the total analog signal averaged over the sampling aperture. Therefore, the fractional variation in the digital image ($\Delta I/I$) due to this artifact is given by the ratio of the artifact size (E) to the aperture size (S), i.e., $\Delta I/I = E/S$. Thus, the magnitude of the detected artifact in digital images is related not only to the actual size of the artifact, but also to the size of the sampling aperture.

Table 1 shows the calculated fractional variation in the digital image due to various sizes of line artifacts for different pixel sizes obtained with three I.I. input modes. It is apparent that the detected artifact increases as the pixel size decreases, and thus the use of a small pixel size requires a high mechanical accuracy in the MSA device and also in the scanning motion. Since the slit images are usually blurred by the unsharpness of the imaging system, the fractional variation due to the artifacts is expected to be smaller than the variations listed in Table 1. Thus, the calculated values in Table 1 may be regarded as upper limits for these artifacts.

TABLE 1

| INACCURACY (ARTIFACT SIZE) IN MSA OR SCAN MOTION | I.I. INPUT FORMAT (DIAMETER (PIXEL SIZE)) | | |
|---|---|---|---|
| | 14 cm (0.28 mm) | 17 cm (0.36 mm) | 25 cm (0.55 mm) |
| 0.01 mm | 5.1% | 4.0% | 2.6% |
| 0.02 mm | 10.2% | 7.9% | 5.2% |
| 0.03 mm | 15.3% | 11.9% | 7.8% |

Figure 7:
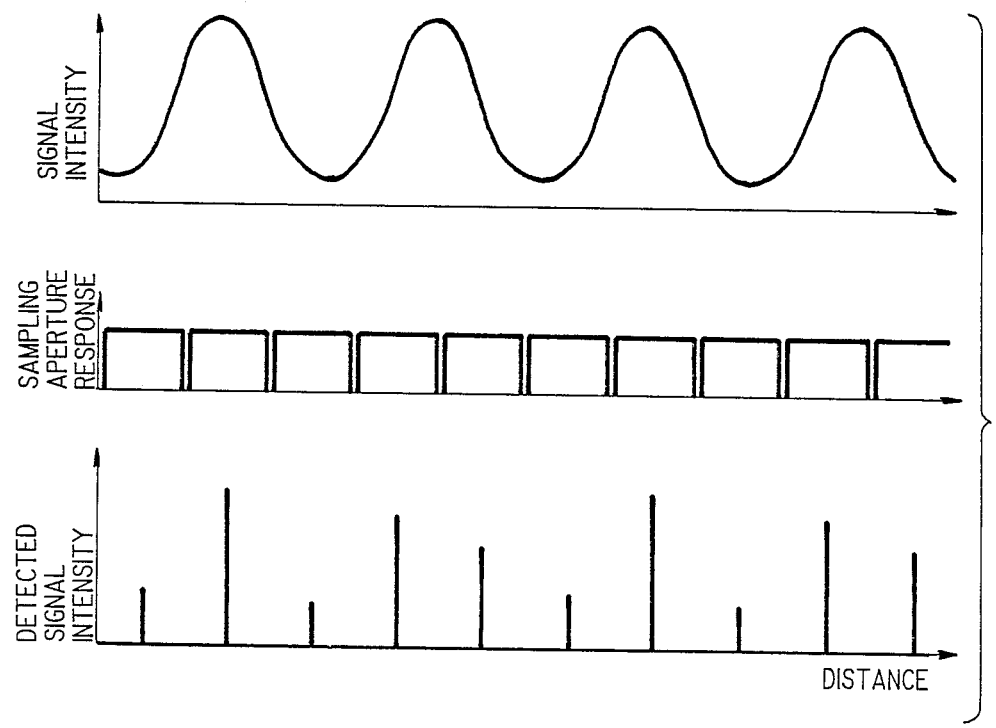
FIG. 7 is an illustration of moire pattern caused by undersampling of the image signal, in which the moire pattern is formed by interference of two different spatial frequencies included in the MSA and the data sampling.

When the sampling distance (or pixel size) for digitization of MSA original images is large, the signals may be undersampled, and consequently a moire pattern may appear in the detected signals, as shown in FIG. 7. The upper portion illustrates the one-dimensional profile of an original MSA image. This image signal is sampled by the sampling apertures shown in the middle. When the MSA image is undersampled, the moire pattern will appear in the detected signal as the inteference of two different spatial frequencies that are included in the MSA and the data sampling. The moire pattern will remain in the reconstructed image. Since the frequency of the moire pattern is determined by the difference between the two spatial frequencies, the moire pattern is a low frequency pattern, which is easily recognizable and often distracting.

Experimental results were obtained with the MSA which included an 0.2 mm slit width and 0.8 mm lead spacers, and the 25 cm I.I. mode. It was found that reconstructed images showed two slightly different moire patterns when the initial position of the MSA was shifted by one-half the slit width, namely, the reconstructed image resulted in a counter-phased moire pattern. Therefore, if the final reconstructed image is made by the sum of these two images, that is, if the MSA original images are obtained from an "overlapped" scan by shifting of the MSA by a distance increment of one-half the slit width, the moire pattern can be eliminated.

Figure 8:
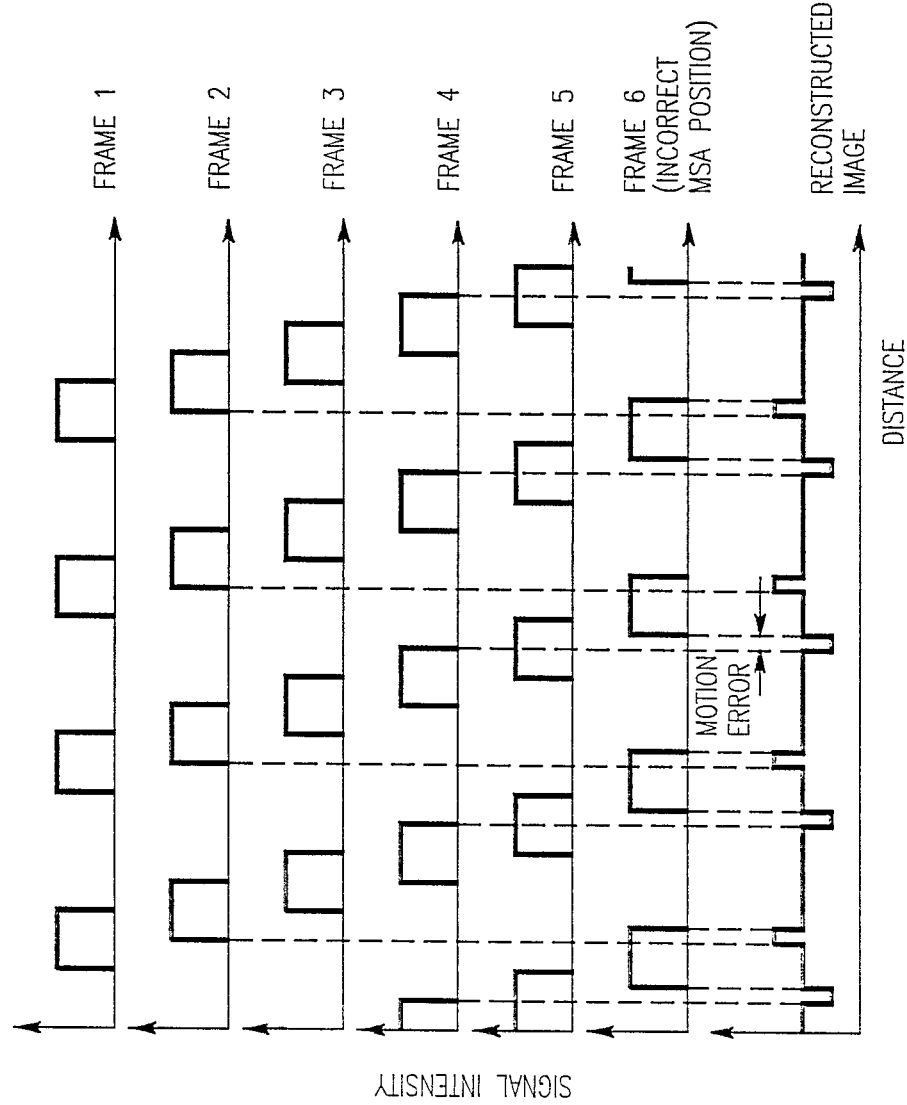
FIG. 8 is a timing diagram illustrating overlap scanning of the MSA can reduce the magnitude of line artifacts caused by MSA slit width, lead spacer width, or scan-motion error, wherein line artifact is reduced to one-half by the overlap scanning.

Overlap scanning of the MSA can also reduce the magnitude of line artifacts caused by the MSA itself or by scan-motion error, as shown in FIG. 8. In overlap scanning, the beam widths of adjacent frames of radiation exposure overlap, for example, by roughly 50% as shown in FIG. 8. The line artifact caused by this scan-motion error is reduced to one half by the overlap scanning. If one MSA is scanned with an increment of one-quarter of the slit width, the magnitude of the line artifact will be reduced further, to one quarter. It is expected that, as the number of overlaps in the acquired MSA images increases, the magnitude of these artifacts will decrease. Table 2 summarizes the artifacts associated with the MSA imaging technique. The artifacts may be caused by inaccuracy of the slit width, lead spacer width and scan motion of the MSA and by undersampling. In an actual imaging system, it is likely that the artifacts are caused by a combination of these factors.

TABLE 2

| Case of Artifact | Increase (+) or Decrease (−) in Signal | Number of Artifacts/ Slit-Plus-Spacer Distance |
|---|---|---|
| Slit Width | | |
| Oversized | + | N − 1 |
| Undersized | − | N − 1 |
| Lead Spacer | | |
| Oversized | − | 1 |
| Undersized | + | 1 |
| Split Width (Oversized) and Lead Spacer (Oversized) | + And − | N − 1 And 1 |
| MSA Scan-Motion | | |
| Overshift | − And + | 1 And 1 |
| Undershift | + And − | 1 And 1 |
| Undersampling | Moire Pattern | |

N = Minimum number of image frames required for reconstruction (slit-plus-spacer distance slit/width)

The results obtained in the study performed by the inventors indicate that scatter and veiling glare in the image obtained with the I.I-TV system can be reduced effectively with the multiple slit beam imaging and image data reconstruction technique above described. The contrast and sharpness of images obtained with the I.I.-TV system can be improved significantly. Additional potential advantages of the MSA imaging technique include an improvement in the signal-to-noise ratio (SNR) and in the dynamic range of the reconstructed image, as has been demonstrated in previous studies by Plenkovick, et al. and Doi, et al., above noted.

One disadvantage of the MSA imaging technique is the long exposure time required for obtaining a number of imaging frames, in comparison with that in the conventional wide beam technique. The total exposure time used with the technique with pulse exposure mode is of the order of a few seconds, because of the mechanical scanning of the MSA. However, the total exposure time can be reduced substantially to a level that can be applied to many practical situations in clinical studies. One approach to shortening the exposure time will be to employ a scanning x-ray tube (See Doi, et al., supra) so that the mechanical scan of the MSA can be eliminated. The rapid sequence of pulsed or continuous exposures from the scanning x-ray tube will provide a number of image frames to be used for image reconstruction. Another approach is to move the MSA continuously at a constant high speed, while continuous x-ray exposures are made and a number of image frames are acquired at a high frame rate, up to the TV frame rate. Since the frame rate of the Siemens Videomed H TV system which were employed in this study is 60 frames/s, a total of 10 image frames can be obtained in 0.167 seconds, which appears to be short enough for clinical applications.

The MSAs used in the study performed by the inventors required a relatively large number of image frames for reconstruction, namely, at least 5, 10, and 20 frames. Such a large number of image frames tend to decrease scatter and veiling glare because of the relatively wide lead spacers of the MSA; however, this requires a long exposure time. Therefore, another useful approach to achieving short exposure times will be to use MSAs with a small number of image frames required for reconstruction (e.g., 2, 3, and 4 frames). An additional advantage of such MSAs is an improvement in the x-ray beam utilization and consequently a lesser requirement for the x-ray tube output.

One of the important considerations in the MSA imaging technique is the proper selection of the slit width, the lead spacer width, and/or the minimum number of image frames required for reconstruction. However, it is difficult to find an "optimal" combination, since the imaging properties and some of the practical factors are related in a complicated way to changes in many parameters. For example, the large number of image frames required for reconstruction can reduce the fraction of scatter and veiling glare included in the original MSA images, whereas a small number of image frames can decrease the total exposure time and increase the efficiency of x-ray output utilization. A wide slit tends to decrease the fraction of scatter and veiling glare in the original MSA images, whereas a narrow slit tends to decrease the fraction of scatter and veiling glare in the reconstructed image. A wide lead spacer reduces the fraction of scatter and veiling glare in the original MSA images, whereas a narrow lead spacer can provide a good estimate of a narrow-angle, localized scatter and veiling glare distribution, thus yielding an enhanced image.

Summarizing, as above described, a first technique in image reconstruction according to the present invention includes the removal of scatter and veiling glare from initially acquired original MSA images. The minimum x-ray intensity (or signal level) at each pixel is determined from a set of original MSA images. Then the cutoff level, which is expected to remove scatter and veiling glare, is determined empirically as the minimum intensity plus a constant ($k=\frac{1}{4}$ has been determined to give excellent results) times the square root of the minimum intensity. By subtracting the cutoff levels at each pixel from the original MSA images, a set of slit images with the same matrix size as that of the I.I.-TV digital system, which mainly contain primary components, can be obtained. These calculations are performed in terms of relative x-ray intensity which is converted from pixel value using the characteristic curve of the I.I.-TV digital system. (See Fujita H, Doi K, Giger ML, Chan H-P: *Med Phys* 13:13, 1986.)

A second technique which can be used in conjunction with the above-noted technique, according to the invention is directed particularly to improving the spatial resolution by use of a MSA having a narrow slit width. When the slit width of the MSA is narrower than the pixel size of the I.I.-TV digital system, one pixel detects at least two signals from different MSA placements in different image frames. According to this aspect of the invention, the detected signals of the slit images are assigned to a large size matrix. The spatial resolution in the direction perpendicular to the slit openings thus can be improved along with the increased contrast and SNR as the scatter and veiling glare can be removed also.

In particular, in the first technique of the invention above described, the computations for the image reconstruction in previous studies were performed at each pixel in the I.I.-TV digital system. Therefore, the reconstructed images were obtained in the same matrix size as that of the I.I.-TV digital system. The matrix size of I.I.-TV digital systems commonly used for digital subtraction angiography (DSA) is 512×512, and a large matrix size of 1024×1024 is also available. However, these matrix sizes are not large enough to yield as high a resolution image obtainable with a conventional screen-film system. In order to achieve such resolution, according to the present invention the primary components corresponding to the slit openings in each image frame are assigned to proper locations in the large matrix, as illustrated in FIG. 9.

Figure 9:
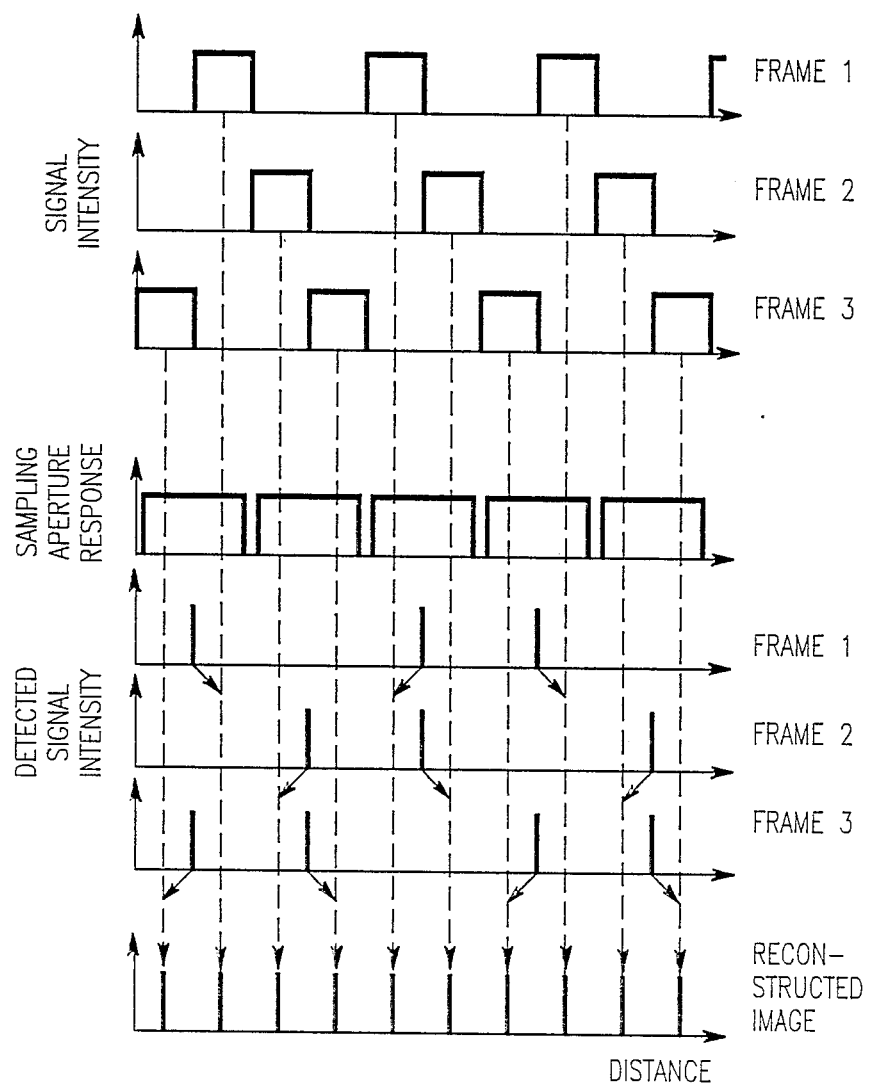
FIG. 9 is a timing diagram illustrating a technique of the invention useful for improving spatial resolution of a reconstructed image.

According to the invention as shown in FIG. 9, a projected slit image in an actual I.I.-TV digital system may be distributed over two or more pixels. In order to determine the primary component for a given slit in each image frame, therefore, the corresponding slit image profile is identified in the direction perpendicular to the slit openings, and the relative x-ray intensities distributed over neighboring pixels due to a slit opening are summed up as the primary component. Thus, the primary components corresponding to slit openings in each frame are obtained, and then assigned to appropriate pixels in the enlarged matrix in the direction perpendicular to the slit openings. In the other orthogonal direction parallel to the slit openings, the matrix size remains the same as that of the detector system. However, in order to balance the image aspect ratio, the matrix size is expanded in the direction parallel to the slit openings, and the corresponding pixel values in the expanded matrix are determined by linear interpolation.

Figure 10:
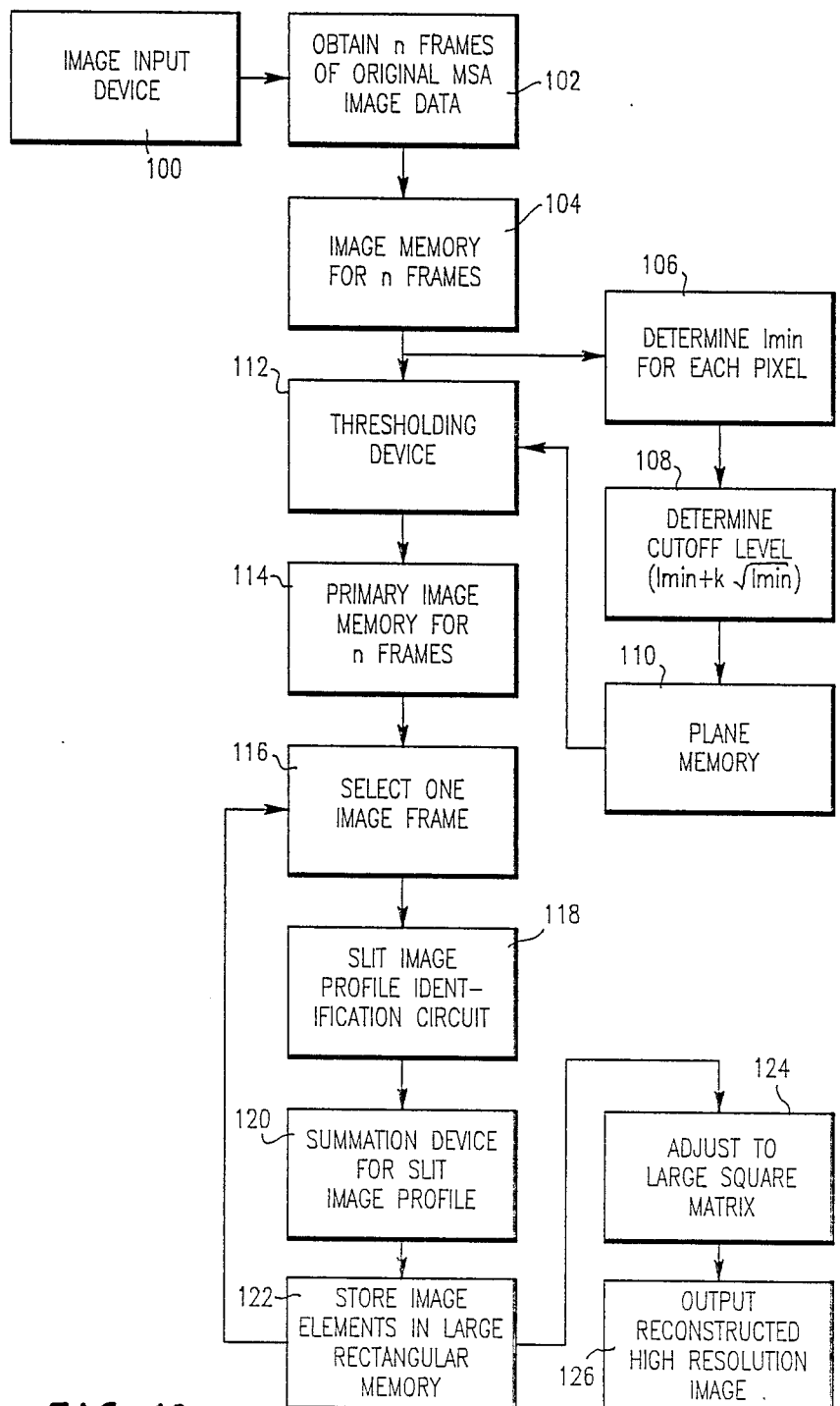
FIG. 10 is a schematic block diagram illustrating the image reconstruction system of the invention used in implementing the technique shown in FIG. 9.

FIG. 10 shows a system for implementing the enhanced resolution image reconstruction technique shown in FIG. 9. In FIG. 10, from an image input device (block 100), n frames of original MSA image data are obtained (block 102). The n frames of original MSA image data are stored in an image memory (block 104). Then, the minimum pixel intensity ($I_{min}$) is determined for each pixel for the n frames of stored image data (block 106) and a cutoff level for removing scatter and veiling glare is determined (block 108). The determined cutoff levels for each pixel are then stored in a plane memory (block 110). Thereafter, the image data stored in the image memory are read out from the image memory and subjected to thresholds comparison with respective cutoff levels stored in the plane memory (block 112). The n frames of image memory having scatter and veiling glare removed therefrom as a result of the thresholding (block 112), are then stored in a primary image memory (block 114).

In the blocks 116–122 shown in FIG. 10, pixel assignment in a direction perpendicular to the slit width in the expanded matrix is performed. Before describing these blocks, however, reference is made to FIGS. 11a and 11b. FIG. 11a schematically illustrates three frames of image data obtained in block (102) and FIG. 11b schematically illustrates the primary image for the three frames at an arbitrary line m perpendicular to the scanning slit shown in FIG. 11a of each frame. In other words, FIG. 11b illustrates schematically the slit image profiles along the lines m of each of frames 1–3 shown in FIG. 11a, with the effects of scatter and veiling glare removed.

Because of signal spreading in image acquisition (block 102), even through the beam width of each MSA slit is narrower than a pixel size, nevertheless the slit image profile obtained at any one line m (block 114) spreads across plural pixels. In constructing an expanded image matrix, the slit image profile from each slit of the MSA is first determined and then assigned to adjacent pixels in the expanded image matrix in a direction perpendicular to the scanning beam, consistent with the scanning movement of the MSA.

The above matrix expansion is next described in relation to blocks (116)–(122) shown in FIG. 10. In block (116), one of the image frames is selected, for example, the first image frame. Then, for each line, such as the line m shown in FIG. 11a, the slit image profiles for each beam of that frame is identified in block (118). More particular, in block (118), in the selected frame those pixels along the line m having a maximum signal intensity are determined. Then, in block (120), the slit image profile is defined by adding the pixel value of each pixel identified in block 118 to the pixel values of the adjacent pixels on either side thereof. In block (122), the result of the summation is stored in a large rectangular matrix as shown in FIG. 11c.

Figure 11C:
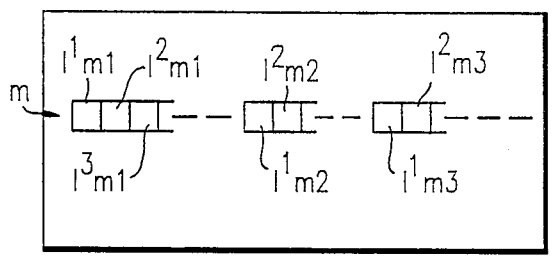
Figure 11D:
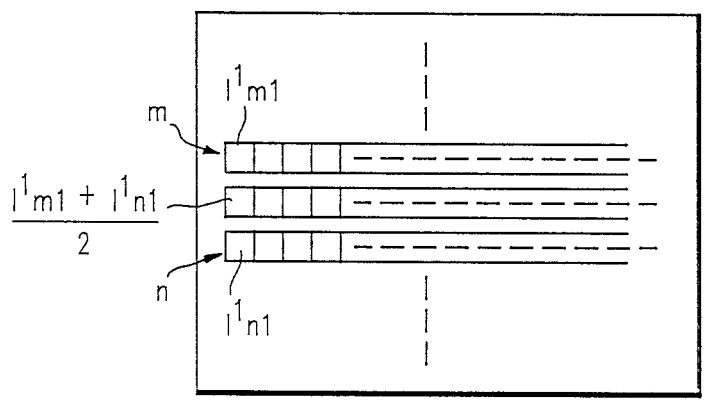

Thus, as seen in FIG. 11c, for the reconstructed image in the expanded matrix along the line m, the first pixel in the expanded image is assigned the pixel value derived from the slit image profile $I_{m1}^1$. The second pixel in the expanded matrix along the line m is assigned the summation indicative of the slit image profile of the second frame, $I_{m1}^2$, again along the line m, obtained from the first scanning beam. Similarly, the third pixel of the expanded matrix is assigned a value based on the slit image profile $I_{m1}^3$ obtained from the first beam in the third frame. The overall geometry is selected such that the slit image profile of the first beam of the last frame is assigned to the pixel in the enlarged image matrix immediately adjacent the pixel assigned the value of the slit image profile of the second beam in the first frame of image data, and so on. In this way, each line of the expanded image matrix, i.e. expanded in a direction perpendicular to the slit of the scanning beam, is determined.

After obtaining the one-dimensionally expanded image matrix shown in FIG. 11c, in one embodiment of the invention the expanded matrix is expanded in a direction parallel to the slit of the scanning beam by interpolation (linear interpolation being preferred, it being noted that other interpolation techniques can be used) of the pixel values assigned in a direction perpendicular to the slit of the scanning beam. In this way, the aspect ratio of the reconstructed image is equalized in block (124) shown in FIG. 10. Then, in block (126) shown in FIG. 10 the reconstructed high resolution image is output.

Instead of using interpolation to equalize the aspect ratio of the reconstructed image as above described, other techniques offering improved resolution are also possible according to the present invention. In particular, after completing the processing steps performed in the block (124) shown in FIG. 10, the position of the MSA 10 is rotated 90°. Then, the scanning and image processing steps previously described are repeated for the data obtained by scanning of the MSA rotated 90°, to obtain a second reconstructed image having its resolution improved in a direction perpendicular to that in the first reconstructed image. Then, according to the invention, the pixel values of the first and second images can simply be added to derive a reconstructed image in which scatter and veiling glare have been removed and in which resolution is improved in two dimensions.

Alternatively, another technique for obtaining two dimensional improvement in resolution is to employ two MSAs 10 arranged perpendicular to one other between the x-ray tube 12 and the object 14. In this embodiment, one of the MSAs 10 would be scanned at a rate faster than the other to achieve a raster effect.

Experiments were performed with the set-up shown in FIG. 1 using an MSA 10 having an 0.2 mm slit width and 1.8 mm lead spacer width. The MSA 10 was placed between the x-ray tube 12 and object 14. The distance between the x-ray tube focal spot and the MSA 10 was 63 cm, and the distance between the x-ray tube focal spot and the I.I. input image plane was 87 cm. An antiscatter grid (not shown) of 40 lines/cm, 12:1 ratio and paper spacer was used. A Siemens Optilux RBV 25/17 image intensifier/Videomed H TV system (1024 lines with progressive raster scanning) 20, and a Digitron 2 DSA system 22 connected with a Garantix 1000 generator were used as a detector system. The acquisition matrix size of the system was 512×512. A continuous exposure mode was employed, where the DSA system 22 integrates adjacent two raster lines to reduce progressive scanned 1024 lines to 512 lines. The I.I. input format was 25 cm diameter, yielding an effective pixel size of 0.55 mm. Therefore, the projected slit width on the I.I. input plane was approximately one half the pixel size. The MSA 10 was continuously moved by using a stepping motor with a speed of 3.0 mm/sec and the frame rate of image acquisition was 15 frames/sec. This resulted in the MSA being shifted between the image acquisition frames by a distance of 0.2 mm which corresponds to the slit width. Acquired MSA image data were transferred via a magnetic tape to a DEC VAX 11/750 computer 28 interfaced with a Gould FD 5000 image display system (not shown). All of the calculations for the image reconstruction were performed on the VAX system 28.

The experiments performed confirmed that multiple slit beam imaging technique by using narrow slit openings and the reconstruction methods of the invention can improve the spatial resolution of images obtained with the I.I.-TV digital system, in addition to improvement in the contrast and SNR by reducing the scatter and veiling glare. However, it should be noted that in the described study, improved resolution occured predominantly in one direction, namely, in the direction perpendicular to the slit openings when pixel values in the parallel direction are assigned using interpolation.

It is possible in principle that a very large improvement of spatial resolution in one direction can be realized by employing a very narrow slit width much less than the pixel size of the system and which is far less than the slit width used in this study. However, the practical importance of the resulting overall improvement and the limitations of such anisotropic images are not known. In order to examine the effect of anisotropic resolution on the overall image quality, a simulation study was performed. From these results, the matrix size in one direction which is twice as large as that in the other direction seems to provide an appreciable improvement in the overall image quality. Therefore, the selection of the slit width at one half the pixel size is appropriate for a resolution improvement achievable with multiple narrow-slit beam imaging techniques.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for reconstructing an image obtained from plural sequential radiographic exposures of an object using a multiple slit beam scanning system including a radiation source for radiating the object, a multiple slit beam scanning assembly positioned between the source and the object, and means for performing plural successive image acquisition steps for acquiring successive frames of original image data, wherein the original image data of each successive frame is in the form of plural pixels and corresponds to radiation passing through the scanning assembly and the object at respective of successive image acquisition steps, comprising the following steps:
    producing relative movement between the source and the scanning assembly;
    performing plural successive image acquisitioin steps during production of said relative movement, wherein original image data are acquired for each pixel at each of said successive image acquisition steps during production of said relative movement;
    determining for each pixel a minimum pixel value of original image data acquired during the successive image acquisition steps;
    comparing the image data of each pixel acquired at each of the image acquisition steps with a respective comparison cutoff value which bears a predetermined relationship to the minimum value for each pixel determined in said determining step;
    summing for each pixel only the values of original image data acquired during the plural image acquisition steps which exceed said cutoff value as determined in the comparing step; and
    outputting a reconstructed image data based at least in part on the sums produced in said summing step.

2. The method according to claim 1, wherein said comparing step comprises:
    selecting said comparison cutoff value, $I_{cutoff}$, as follows, $$I_{cutoff} = I_{min} + k\sqrt{I_{min}},$$

where $I_{min}$ equals the minimum value of original image data acquired during said successive image acquisition steps, and k equals a predetermined positive fraction less than one.

3. The method according to claim 2, wherein k equals one-fourth.

4. The method according to claim 1, comprising:
    selecting a slit beam width of said scanning assembly to be larger than a pixel size of the original image data acquired by said means for performing plural successive image acquisition steps, and producing said relative movement at a distance step smaller than the slit beam width so that beams from the scanning assembly overlap during consecutive image acquisition steps.

5. The method according to claim 1, comprising:
    selecting a slit beam width of said scanning assembly to be narrower than a pixel size of said original image data acquired by said means for performing plural successive image acquisition steps at an image plane of said means for performing plural successive image acquisition steps.

6. The method according to claim 5, wherein the slit beam width is selected to be less than the pixel size, further comprising:
    acquiring a series of image data derived from radiation passing through a common slit of said scanning assembly in consecutive image acquisition steps; and
    forming an enlarged matrix by assigning said series of image data to adjacent respective series of pixels in the enlarged matrix in which the adjacent series of pixels are arranged in a direction perpendicular to the scanning beams.

7. The method according to claim 6, comprising:
    balancing an image aspect ratio of the enlarged matrix by assigning pixel values using linear interpolation to selected pixels of the enlarged matrix in a direction parallel to the scanning beams.

8. A system for reconstructing an image obtained from plural sequential exposures of an object by a radiation source comprising:
    multiple slit beam scanning means positioned between the source and the object for exposing said object with radiation emanating from said source and passing through said scanning means;
    means for performing plural successive image acquisition steps in which successive frames of original image data each in the form of plural pixels are acquired at said plural successive image data acquisition steps during relative movement of said source and said scanning means;
    means for determining for each pixel a minimum value ($I_{min}$) of image data acquired during the successive image data acquisition steps;
    means for comparing the image data of each pixel acquired for each frame with a comparison cutoff value which bears a predetermined relationship to the minimum pixel value for that frame;
    means for summing for each pixel all of the values of original image data which exceed said cutoff value for all of said frames of original image data; and
    means for outputting a reconstructed image data based at least in part on the sums produced by said summing means.

9. The system according to claim 8, wherein said comparing means comprises:
    means for producing a cutoff value, $I_{cutoff}$, as follows:

$$I_{cutoff} = I_{min} + k\sqrt{I_{min}},$$

where k is a predetermined positive fraction less than one.

10. The system according to claim 9, wherein k equal one-fourth.

11. The system according to claim 8, comprising:
said scanning means having a slit beam width selected to be larger than a pixel size of the original image data acquired by said means for performing plural successive image acquisition steps; and
said relative movement producing means producing relative movements at a distance increment smaller than the slit beam width so that beams from the scanning means overlap during consecutive image acquisition steps.

12. The system according to claim 8, comprising:
said scanning means having a slit beam width selected to be narrower than a pixel size of said original image data acquired by said means for performing plural successive image acquisition steps at an image plane of said means for performing plural successive image acquisition steps.

13. The system according to claim 12, further comprising:
means for producing based on said original image data a series of image data derived from radiation passing through a common slit of the scanning means in successive image acquisition steps; and
means for forming an enlarged image data matrix by assigning said series of image data to a respective series of adjacent pixels in said enlarged matrix in which the respective series of adjacent pixels are arranged in a direction perpendicular to the scanning beams.

14. The method according to claim 13 comprising:
means for balancing an image aspect ratio of the enlarged matrix by assigning pixel values using interpolation to selected pixels of the enlarged matrix in a direction parallel to the scanning beams.

15. A method for reconstructing an image obtained from plural sequential radiographic exposures of an object using a multiple slit beam scanning assembly including a radiation source for radiating the object, a multiple slit beam scanning assembly positioned between the source and the object, means for producing relative movement between the source and the scanning assembly, and means for performing plural successive image acquisition steps in which original image data in the form of plural pixels are acquired at said successive image acquisition steps during relative movement of said source and said scanning assembly, said original image data corresponding to radiation passing through the scanning assembly and the object at each of said image acquisition steps comprising:
selecting a slit beam width of said scanning assembly to be narrower than a pixel size of said original image data acquired by said means for performing plural successive image acquisition steps at an image plane of said means for performing plural successive image acquisition steps;
producing relative movement between the source and the scanning assembly;
producing a series of image data derived from radiation passing through a common slit of the scanning assembly in consecutive image acquisition steps performed by said means for performing plural successive image acquisition steps during relative movement of said source and scanning assembly steps;
forming an enlarged pixel matrix by assigning said series of image data to respective series of adjacent pixels arranged in a direction perpendicular to the scanning beams of said scanning assembly in the enlarged pixel matrix; and
forming an image based at least in part on said series of image data assigned to said enlarged pixel matrix.

16. The method according to claim 15 further comprising:
balancing an image aspect of the enlarged pixel matrix by assigning pixel values using linear interpolation to pixels in the enlarged matrix arranged in a direction parallel to the scanning beams.

17. A system for reconstructing an image obtained from plural sequential exposures of an object by a radiation source, comprising:
multiple slit beam scanning means positioned between the source and the object for exposing the object with radiation emanating from said source and passing through said scanning means;
means for producing relative movement between the source and the scanning means;
means for performing plural successive image acquisition steps in which successive frames of original image data each in the form of a matrix of plural pixels are acquired at each of said plural image data acquisition steps upon relative movements of said source and said scanning means;
said scanning means having a slit beam width selected to be narrower than a pixel size of the pixel matrix at an image plane of said means for performing plural image acquisition steps;
means for producing based on said original image data a series of image data derived from radiation passing through a common slit of the scanning means in consecutive image acquisition steps;
means for forming an enlarged pixel matrix by assigning said series of image data to a respective series of adjacent pixels arranged in a direction perpendicular to the scanning beams of said scanning means in the enlarged pixel matrix; and
means for forming an image based at least in part on said series of image data assigned in said enlarged pixel matrix.

18. The system according to claim 17, comprising:
means for balancing an image aspect ratio of the enlarged matrix by assigning pixel values using interpolation to selected pixels of the enlarged matrix in a direction parallel to the scanning beams.

* * * * *

UNITED STATES PATENT AND TRADEMARK OFFICE
CERTIFICATE OF CORRECTION

PATENT NO.   :   4,841,555

DATED        :   June 20, 1989

INVENTOR(S)  :   KUNIO DOI, ET AL

It is certified that error appears in the above-identified patent and that said Letters Patent is hereby corrected as shown below:

TITLE PAGE, ITEM [54]-
Please correct the title of the invention to read as follows:

METHOD AND SYSTEM FOR REMOVING SCATTER AND VEILING GLARE AND OTHER ARTIFACTS IN DIGITAL RADIOGRAPHY.

In Column 1, line 5, before "BACKGROUND OF THE INVENTION" insert the following paragraph:

The present invention was made in part with U.S. Government support under grant number 2 R01 CA24806-11 from the Department of Health and Human Services and National Cancer Institute. The U.S. Government has certain rights in the invention.

Signed and Sealed this

Twenty-eighth Day of May, 1991

Attest:

HARRY F. MANBECK, JR.

Attesting Officer

Commissioner of Patents and Trademarks